Dec. 28, 1965 K. FAUL 3,225,380
DEVICE FOR STABILIZING LEGGED FURNITURE
Filed June 26, 1964 2 Sheets-Sheet 1

INVENTOR.
KARL FAUL
BY
ATTORNEYS

Dec. 28, 1965 K. FAUL 3,225,380
DEVICE FOR STABILIZING LEGGED FURNITURE
Filed June 26, 1964 2 Sheets-Sheet 2

INVENTOR.
KARL FAUL
BY
ATTORNEY

United States Patent Office 3,225,380
Patented Dec. 28, 1965

3,225,380
DEVICE FOR STABILIZING LEGGED FURNITURE
Karl Faul, 109 Gumpendorferstrasse,
Vienna VI, Austria
Filed June 26, 1964, Ser. No. 378,339
Claims priority, application Austria, July 4, 1963,
A 5,333/63
4 Claims. (Cl. 16—32)

This invention relates to a device for stabilizing legged furniture, particularly tables, which are unsteady because their legs have uneven lengths or stand on an uneven floor.

For this purpose, devices have already been disclosed which consist of two telescoped parts, which are cushioned by a coil spring and secured to the lower ends of the table legs as an aligned extension thereof. To avoid a resilient movement of the table when the same is loaded or unloaded, the space around the spring is filled with a liquid and the inner end of the extensible part is connected by a short piston rod to a tightly fitted piston, which has a bore forming an orifice. During a displacement of the telescoped parts, the liquid flows through this orifice from one side to the piston to the other so that the otherwise ensuing vibrational movement of the table is damped.

The sealing of the hydraulic dashpot involves difficulties and gives rise to trouble.

The present invention provides between the two telescoped parts a layer of material having a high toughness for braking the outward movement of the telescoped part caused under the influence of said pressure element. This interlayer has the advantage that owing to its toughness it cannot flow out of the housing so that there is no need for a seal.

It is another feature of the invention that said layer is formed by a nonhardenable, adhesive mass.

Finally it is a feature of the invention that the surfaces of the parts which are braked by said layer are roughened or provided with depressions or elevations.

Four illustrative embodiments of the invention are shown in axial longitudinal sectional views in the drawing, in which.

Figure 1:
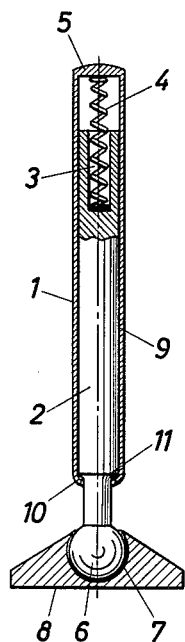
FIG. 1 is a longitudinal section view taken axially of a furniture leg castor device according to the invention.

The device shown in FIG. 1 comprises a cylindrical housing 1, which is closed at its top and inserted into and fixed in an axial bore in the lower end of the table leg. A piston 2 is axially slidable in the housing 1 and is provided at its inner end with a bore 3 for receiving a coil spring 4, the free end of which bears on the cover 5 of the housing 1. The outer end of the piston 2 is offset and terminates in a ball 6, which is rotatably mounted in a socket 7 of a leg part 8. The ball and socket arrangement may be replaced by a roller. A layer 9 consisting of a tough, preferably adhesive mass is provided between the piston 2 and the housing 1 and exerts a strong braking effect on the movement between the piston 2 and the housing 1. This mass may consist of a non-hardenable gumlike substance, such as birdlime. A mass such as is used on self-adhering tapes of paper or plastics material may also be used with success. The rim of the open end of the housing 1 is turned inwardly. This bead 10 is formed when the device has been assembled and protrudes into the path of the shoulder 11 of the piston 2 to limit its movement.

The described device is mainly intended for tables having four legs and is attached to each leg. The rate of the spring 4 and its length are designed so that the devices at three legs are substantially completely extended, with the piston 2 in its fully extended position, whereas any difference between the height of the legs or surface irregularities is compensated at the fourth leg.

Figure 2:
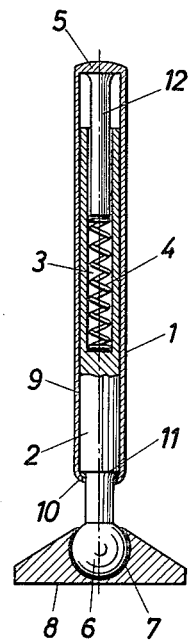
FIG. 2 is a view similar to FIG. 1 of a modified device.

The device shown in FIG. 2 is similar in construction to that of FIG. 1 with the difference that the bore 3 in the piston is longer and receives an extension 12 of the cover 5. The spring 4 bears on this extension. Different from the form shown, the layer 9 may be provided between the extension 12 and the wall of the bore 3 or at both points.

Figure 3:
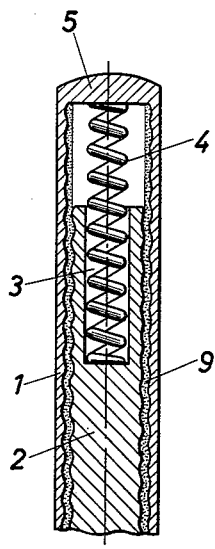
FIG. 3 is an enlarged fragmentary sectional view of an embodiment similar to that of FIG. 1 in which the surfaces of the telescoping parts are roughened.
Figure 4:
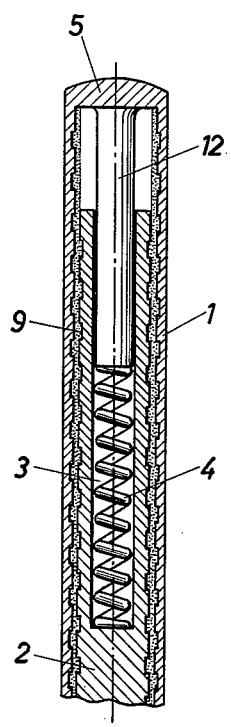
FIG. 4 is an enlarged fragmentary sectional view of an embodiment similar to that of FIG. 2 in which certain surfaces of the telescoping parts are provided with elevations and depressions.

To increase the adherence of the layer 9 to the walls of the assembled parts, these may be roughened, as shown in FIG. 3 or provided with elevations or depressions as illustrated in FIG. 4.

It will be understood that further modifications in design are possible within the scope of the invention. For instance, more than two telescoped parts may be used. In this case the braking layer 9 may be selectively provided between two or more of the parts.

What is claimed is:

1. A device for stabilizing furniture of a type suitable for positioning on a floor having irregularities and normally occupied or used without movement, comprising a tubular housing insertable in the axial direction into a furniture leg from the underside, at least one axially displaceable, downwardly protruding, telescoping part closely fitting in and slideably disposed in said cylindrical housing to form an aligned extension of the furniture leg and to rest on a floor, a pressure element disposed between said housing and said telescoping part to exert axial pressure therebetween for pushing said telescoping part partly out of the housing, and a thin layer of a soft, nonhardenable, adhesive, friction material disposed between the surfaces of said telescoping part and said housing which are in sliding engagement for braking the relative sliding movements of the telescoping part with respect to the tubular housing.

2. A device as set forth in claim 1, wherein said surfaces of the telescoping part and of the housing which enclose the layer of friction material are roughened.

3. A device as set forth in claim 1, wherein said surfaces of the telescoping part and of the housing which enclose the layer of friction material are provided with elevations and depressions.

4. A device as set forth in claim 1, wherein said tubular housing is provided with a downward extension which projects into a bore having a bottom and disposed in said telescoping part, said pressure element being seated on said bottom, and a layer of soft friction material disposed between the wall of said bore and said extension.

References Cited by the Examiner

UNITED STATES PATENTS

| | | | |
|---|---|---|---|
| 426,020 | 4/1890 | Howell | 16—44 |
| 2,176,551 | 11/1939 | Solem | 16—44 X |
| 2,243,565 | 5/1941 | Kimball et al. | 16—44 X |
| 2,796,953 | 6/1957 | Becker | 188—101 X |
| 2,852,883 | 9/1958 | Walsh | 16—44 |

FOREIGN PATENTS

| | | |
|---|---|---|
| 1,026,764 | 5/1953 | France. |
| 680,851 | 11/1952 | Great Britain. |

JOSEPH D. SEERS, *Primary Examiner.*

D. L. BURGESS, *Assistant Examiner.*